(12) United States Patent
Davis et al.

(10) Patent No.: US 7,939,148 B2
(45) Date of Patent: May 10, 2011

(54) COLLATION SHRINK

(75) Inventors: Donna Sue Davis, Beaumont, TX (US); Maksymilian Pierre Ravel, Zaventem (BE)

(73) Assignee: ExxonMobil Chemical Patents Inc., Houston, TX (US)

(*) Notice: Subject to any disclaimer, the term of this patent is extended or adjusted under 35 U.S.C. 154(b) by 267 days.

(21) Appl. No.: 10/803,318

(22) Filed: Mar. 18, 2004

(65) Prior Publication Data

US 2005/0064218 A1    Mar. 24, 2005

Related U.S. Application Data

(63) Continuation-in-part of application No. 10/669,221, filed on Sep. 24, 2003, now Pat. No. 7,422,786.

(51) Int. Cl.
*B32B 27/00* (2006.01)
*B32B 27/32* (2006.01)
*B32B 1/00* (2006.01)

(52) U.S. Cl. ........ 428/34.9; 428/34.1; 428/34.2; 428/35.7; 428/35.9; 428/36.9; 428/515; 428/516

(58) Field of Classification Search ........ 428/34.1, 428/34.2, 35.7, 35.9, 36.9, 34.9, 515, 516
See application file for complete search history.

(56) References Cited

U.S. PATENT DOCUMENTS

| | | | |
|---|---|---|---|
| 3,939,627 A * | 2/1976 | Mermelstein | 53/329.3 |
| 4,038,446 A * | 7/1977 | Rhoads | 428/34.9 |
| 4,126,648 A * | 11/1978 | Agouri et al. | 525/193 |
| 4,657,811 A * | 4/1987 | Boyd et al. | 428/318.6 |
| 4,808,561 A | 2/1989 | Welborn, Jr. | 502/104 |
| 4,820,557 A | 4/1989 | Warren | 428/34.9 |
| 5,000,992 A * | 3/1991 | Kelch | 428/36.5 |
| 5,017,714 A | 5/1991 | Welborn, Jr. | 556/12 |
| 5,055,438 A | 10/1991 | Canich | 502/117 |
| 5,064,802 A | 11/1991 | Stevens et al. | 502/155 |
| 5,124,418 A | 6/1992 | Welborn, Jr. | 526/348 |
| 5,153,157 A | 10/1992 | Hlatky et al. | 502/117 |
| 5,206,075 A | 4/1993 | Hodgson, Jr. | 428/216 |
| 5,241,031 A | 8/1993 | Mehta | 526/348.1 |
| 5,324,800 A | 6/1994 | Welborn, Jr. et al. | 526/160 |
| 5,374,459 A | 12/1994 | Mumpower et al. | 428/36.7 |
| 5,382,631 A | 1/1995 | Stehling et al. | 525/240 |
| 5,520,972 A * | 5/1996 | Ezaki et al. | 428/35.2 |
| 5,562,958 A | 10/1996 | Walton et al. | 428/34.9 |
| 5,707,751 A * | 1/1998 | Garza et al. | 428/515 |
| 5,749,202 A | 5/1998 | Eichbauer | 53/399 |
| 5,752,362 A | 5/1998 | Eichbauer | 53/399 |
| 5,814,399 A | 9/1998 | Eichbauer | 428/220 |
| 5,902,684 A | 5/1999 | Bullard et al. | 428/575 |
| 5,907,942 A | 6/1999 | Eichbauer | 53/441 |
| 5,907,943 A | 6/1999 | Eichbauer | 53/441 |
| 5,916,692 A * | 6/1999 | Brambilla | 428/516 |
| 5,998,017 A | 12/1999 | Eichbauer | 428/343 |
| 6,187,397 B1 | 2/2001 | Grangette | 428/34.9 |
| 6,340,532 B1 | 1/2002 | Huang et al. | 428/523 |
| 6,368,545 B1 * | 4/2002 | Bailey et al. | 264/514 |
| 6,376,410 B1 | 4/2002 | Burkhardt et al. | 502/103 |
| 6,380,122 B1 | 4/2002 | Kuchta et al. | 502/103 |
| 6,437,064 B1 | 8/2002 | Eckstein et al. | 526/160 |
| 6,476,171 B1 * | 11/2002 | Lue et al. | 526/348 |
| 6,492,010 B1 | 12/2002 | Karaoglu et al. | 428/213 |
| 6,509,087 B2 | 1/2003 | Uehara et al. | 428/213 |
| H2073 H | 7/2003 | Culotta | 525/240 |
| 7,422,786 B2 | 9/2008 | Ravel et al. | 428/220 |
| 2001/0003624 A1 * | 6/2001 | Lind et al. | 428/516 |
| 2002/0187360 A1 | 12/2002 | Uehara et al. | 428/516 |

FOREIGN PATENT DOCUMENTS

| | | |
|---|---|---|
| EP | 0597502 | 11/1993 |
| EP | 0 597 502 | 5/1994 |
| EP | 0597502 A2 | 5/1994 |
| EP | 0597502 A3 | 5/1994 |
| EP | 0516019 B1 | 12/1995 |
| EP | 0461848 B1 | 4/1996 |
| EP | 504418 B2 | 6/2001 |
| EP | 0552911 B1 | 12/2001 |
| JP | 11005874 | 1/1999 |
| JP | 11058635 | 3/1999 |
| WO | WO 9214784 | 9/1992 |
| WO | WO 9303093 | 2/1993 |
| WO | WO 9308221 | 4/1993 |
| WO | WO 9311940 | 6/1993 |
| WO | WO 9312151 | 6/1993 |
| WO | WO 9406857 | 3/1994 |
| WO | WO 9407954 | 4/1994 |
| WO | WO 9418263 | 8/1994 |
| WO | WO 95/00333 | 1/1995 |
| WO | WO 96/11960 | 4/1996 |
| WO | WO 96/11961 | 4/1996 |
| WO | WO 01/44365 | 6/2001 |
| WO | WO 01/98409 | 12/2001 |
| WO | WO 03/029000 | 4/2003 |

OTHER PUBLICATIONS

M. Ravel, "Metallocene Polyethylene for Improved Performance in Collation Shrink", Tappi 9th European PLACE Conference, May 2003.

* cited by examiner

*Primary Examiner* — Marc A Patterson

(57) ABSTRACT

The invention relates to a film structure combining a metallocene-rich layer and an HDPE-containing layer. A preferred embodiment is a structure having metallocene-rich skin layers and an HDPE-containing core. The structures of the invention are particularly useful for collation shrink.

29 Claims, No Drawings

COLLATION SHRINK

CROSS REFERENCE TO RELATED APPLICATION

The present application is a Continuation-in-Part of U.S. application Ser. No. 10/669,221, filed 24 Sep. 2003 now U.S. Pat. No. 7,422,786.

FIELD OF THE INVENTION

The invention relates to co-extruded structures for collation shrink films and blends of polyethylene used therefor.

BACKGROUND OF THE INVENTION

Collation shrink concerns the bundling of items together using heat shrinkable film. Collation shrink is used for a very wide variety of applications and notably for the secondary packaging of food or drinks. Examples include metal cans and plastic bottles.

Typically, films are applied at room temperature and placed under a heat source to shrink. Suitable performance characteristics on the shrink packaging line include sufficient stiffness allowing the film to be correctly wrapped around the items being packaged, sufficient dimensional shrinkage to ensure a snug fit, and a low enough Coefficient of Friction (COF) for machinability and package handling. Films appropriate for use as collation shrink must have a high thermal shrink force to ensure a tight fit and high tensile strength to withstand handling and abuse during transportation.

In addition, the packaging must have excellent display properties including gloss (preferably under different angles to maximize appeal), haze (or "contact clarity") and clarity ("see-through clarity").

Finally, the collation shrink film manufacturer wants the properties of a low melt pressure, and the ability to use low motor power, both allowing higher production rates.

While it is known how to improve many of the above properties individually, currently available structures do not combine all of the properties satisfactorily in a film having sufficiently thin gauge to be commercially attractive.

Polyethylene is an attractive component to use in collation shrink film. Various types of polyethylenes are known in the art. Low density polyethylene ("LDPE") can be prepared at high pressure using free radical initiators and typically has a density in the range of 0.916-0.940 g/cm$^3$. LDPE is also known as "branched" or "heterogeneously branched" polyethylene because of the relatively large number of long chain branches extending from the main polymer backbone. Polyethylene in the same density range, i.e., 0.916 to 0.940 g/cm$^3$, which is linear and does not contain large quantities of long chain branching is also known; this "linear low density polyethylene" ("LLDPE") can be produced with conventional Ziegler-Natta catalysts or with single site catalysts—such as metallocene catalysts. Relatively higher density LDPE or LLDPE, typically in the range of 0.928 to 0.940 g/cm$^3$ are sometimes referred to as medium density polyethylene ("MDPE") or Linear Medium Density Polyethylene (LMDPE). Polyethylenes having still greater density are the high density polyethylenes ("HDPEs"), i.e., polyethylenes having densities greater than 0.940 g/cm$^3$, and are generally prepared with Ziegler-Natta catalysts, chrome catalysts or even single site catalysts such as metallocene catalysts. Very low density polyethylene ("VLDPE") is also known. VLDPEs can be produced by a number of different processes yielding polymers with different properties, but can be generally described as polyethylenes having a density less than 0.916 g/cm$^3$, typically 0.890 to 0.915 g/cm$^3$ or 0.900 to 0.915 g/cm$^3$.

U.S. Pat. No. 6,187,397 teaches a 3-layer co-extruded heat-shrinkable film devoid of metallocene polyethylene. The patent teaches that prior art "high clarity" heat-shrinkable polyethylene films are obtained by coextrusion of three layers comprising a central layer of predominantly (>50 wt. %) free-radical polyethylene having a relative density of 0.918-0.930, optionally with HDPE to confer stiffness, sandwiched between two layers of predominantly (80-90 wt. %) metallocene linear polyethylene having a density of 0.918-0.927.

U.S. Pat. No. 6,340,532 discloses shrink films manufactured from "pseudohomogeneous" linear low density polyethylene resins preferably prepared with an advanced Ziegler Natta catalyst. Various deficiencies of "homogeneous" resins, i.e., metallocene resins, used in prior art shrink films are discussed.

U.S. Pat. No. 6,368,545 teaches a high clarity multilayer blown coextruded film prepared using special methods, wherein a film is described having a central core of HDPE.

U.S. Pat. Application No. 20020187360 is directed to a heat shrinkable, co-extruded polyethylene film laminate having a relatively low melting point core layer comprising a linear low density polyethylene (LLDPE) having a density of 0.910-0.930 g/cm$^3$ and a linear very low density polyethylene (VLDPE) having a density of 0.880-0.915 g/cm$^3$, sandwiched between two relatively higher melting point surface layers comprising a linear low density polyethylene and a linear high density polyethylene.

WO 01/44365 describes a homogeneous blend of a metallocene-catalyzed medium density polyethylene (mMDPE) with a low density polyethylene (LDPE) to produce blown films. The blend may be coextruded between layers of LDPE to make blown films taught in the reference as having the good optical properties of LDPE and the good mechanical and processing properties of MDPE.

Additional patents of interest include U.S. Pat. No. 6,492,010, U.S. Statutory Invention Registration H2073, WO 95/00333 and EP 0597502.

The high gloss provided by metallocene polyethylenes is a very attractive property. However, film layers comprising metallocene polyethylene have a very high coefficient of friction in the absence of specific additives. These additives, in turn, detract from the optical properties desired in collation shrink films. A film exploiting the high gloss capabilities of metallocene polyethylene that can be produced efficiently and having the properties sought in a collation shrink film is highly desirable.

The present inventor has surprisingly discovered that an improved collation shrink film may be achieved by a structure having a core layer comprising HDPE and skin layers comprising metallocene polyethylene and optionally at least one of HDPE or LDPE resins.

SUMMARY OF THE INVENTION

The invention is directed to a film structure having at least two layers: a layer comprising HDPE and layer comprising a metallocene-catalyzed polyethylene (hereinafter mPE), optionally further comprising at least one of HDPE or LDPE. The invention is further directed to a collation shrink-wrapped structure comprising the aforementioned film shrink wrapped around various items.

In a preferred embodiment the film structure comprises a core layer comprising HDPE sandwiched by two metallocene skin layers. In a more preferred embodiment at least one of said metallocene skin layers further comprises at least one of HDPE or LDPE.

It is an object of the present invention to provide various embodiments of the aforementioned inventions having unique properties, particularly with respect to optical, strength, and processing properties, as well as performance in the resultant shrink-wrapped structure.

Another object of the present invention is to provide a collation shrink film having suitable performance on the shrink packaging line.

Still another object of the present invention to provide a shrink collation film having appropriate properties to handle abuse during transportation.

Yet another object of the present invention to provide shrink wrapped structure having attractive display properties at the point of sale.

These and other objects, features, and advantages will become apparent as reference is made to the following detailed description, preferred embodiments, examples, and appended claims.

DETAILED DESCRIPTION

In an embodiment, a film structure is provided having at least two layers. One layer, referred to herein as the first layer and in an embodiment as the core layer, comprises a high density polyethylene (hereinafter "HDPE") and the second layer, also referred to herein as at least one skin layer, comprises a single-site catalyzed polyethylene such as metallocene polyethylene or mPE.

As used herein, HDPE means polyethylene having a density of greater than 0.940 g/cm$^3$. The terms "high density polyethylene" polymer and "HDPE" polymer refer to a homopolymer or copolymer of ethylene having a density greater than 0.940 g/cm. Polymers having more than two types of monomers, such as terpolymers, are also included within the term "copolymer" as used herein.

The comonomers that are useful in general for making HDPE copolymers useful in the present invention include alpha-olefins, such as $C_3$-$C_{20}$ alpha-olefin and preferably $C_3$-$C_{12}$ alpha-olefins. The alpha-olefin comonomer can be linear or branched, and two or more comonomers can be used, if desired. Examples of suitable comonomers include linear $C_3$-$C_{12}$ alpha-olefins, and alpha-olefins having one or more $C_1$-$C_3$ alkyl branches, or an aryl group. Specific examples include propylene; 3-methyl-1-butene; 3,3-dimethyl-1-butene; 1-pentene; 1-butene; 1-pentene with one or more methyl, ethyl or propyl substituents; 1-hexene; 1-hexene with one or more methyl, ethyl or propyl substituents; 1-heptene with one or more methyl, ethyl or propyl substituents; 1-decene; 1-dodecene; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting.

Preferred comonomers include propylene, 1-butene, 1-pentene, 4-methyl-1-pentene, 1-hexene, 1-octene and styrene. Other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta2,5-diene; alkenyl, alkylidene, cycloalkenyl and cycloalkyl idene norbornenes, such as 5-methylene-2-norbornene (NINB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexane, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, and 5-ethylidene-2-norbornene. Particularly preferred diolefins, are 5-ethylidene-2-norbornene (ENB), 1,4-hexadiene, dicyclopentadiene (DCPD), norbornadiene, and 5-vinyl-2norbornene (VNB).

The amount of comonomer used will depend upon the desired density of the HDPE polymer and the specific comonomers selected, taking into account processing conditions such as temperature and pressure and other factors such as the presence or absence of telomers and the like, as would be apparent to one of ordinary skill in the art in possession of the present disclosure.

In one embodiment, the HDPE polymer has a density of greater than 0.940 g/cm$^3$, preferably from about 0.940 g/cm to about 0.970 g/cm$^3$, more preferably from about 0.955 g/cm$^3$ to about 0.965 g/cm$^3$, and most preferably from about 0.960 g/cm$^3$ to about 0.965 g/cm$^3$. Densities referred to herein are in accordance with ASTM D 1505.

In one embodiment, the HDPE polymer may have a melt index from 0.01 to 45 g/10 min, as measured in accordance with ASTM-1238 condition E. The HDPE polymer may be produced using any conventional polymerization process, such as a solution, a slurry, or a gas-phase process, and a suitable catalyst, such as a chrome catalyst, a Ziegler-Natta catalyst or a metallocene catalyst. It is preferred that the HDPEs used in the blends according to the present invention be produced using Ziegler-Natta catalysts.

Examples of suitable HDPE useful in the present invention include HDPEs available from ExxonMobil Chemical Co., Houston, Tex., under the HD, HDA, HMA, HRA, HRP, HDZ or HYA series or under the trademark PAXON. Examples of HDPE include HYA800, produced in the gas phase, and HDZ222, produced by the stirred slurry process. Blends of two or more HDPE polymers and one or more HDPE polymers with one or more non-HDPE polymers are also contemplated.

The HDPE component of the first layer (or, in the case of an embodiment comprising three layers, the HDPE component of the "core layer", described more fully below) should be present in the amount of between about 1 wt. % and 50 wt. %, preferably between about 10 wt. % and 50 wt. %, more preferably between about 15 wt. % and 45 wt. %.

This first layer (or, in an embodiment, core layer) should also comprise from between about 99 wt. % and 50 wt. % LDPE, preferably between about 90 wt. % and 50 wt. %, more preferably between about 85 wt. % and 55 wt. %, even more preferably between about 85 wt. % and about 65 wt. % LDPE. In a preferred embodiment the first layer can also comprise another polyolefin, such as LLDPE (e.g., a tri-blend).

The LDPE suitable for use in the present invention is free-radical initiated LDPE having a density in the range of 0.916 to 0.940 g/cm³, preferably 0.924 to 0.940 g/cm³. In an embodiment, the LDPE blended with the HDPE in this first layer or core layer has a density in the range of 0.916 to 0.935 g/cm³, more preferably 0.926 to 0.935 g/cm³. In another embodiment, the LDPE blended with the HDPE in this layer has a density in the range of 0.916 to 0.927 g/cm³, and more preferably 0.921 to 0.926 g/cm³. Other embodiments include LDPEs having densities from any of the lower density limits specified to any of the higher density limits specified herein, for example, 0.921 to 0.940 g/cm³ and 0.926 to 0.940 g/cm³. Preferred specific LDPEs are LD170BA and experimental grades EX489BA and EX514BA, also available from ExxonMobil Chemical Co., Houston, Tex.

Additional polyolefins may be added, such as VLDPE, provided that that the aforementioned wt. % of HDPE and LDPE is met. Likewise, the blend of HDPE and LDPE may include various additives, as discussed in more detail below. However, in an embodiment it is preferred that the blend of HDPE and LDPE comprising the first layer or core layer of the film structure does not contain slip or antiblock additives. In a preferred embodiment, this layer contains no metallocene polyethylene. In another embodiment, mPE may be added, particularly in the case where additional toughness is required. The composition of this layer may further comprise polypropylene or it may be without polypropylene. Other nonlimiting examples of embodiments of the invention include combinations of the above recited embodiments, such as the HDPE/LDPE blend of the invention without slip or antiblock additives, without a metallocene polyethylene, and without polypropylene, an embodiment comprising HDPE/LDPE blend of the invention without slip or antiblock additive, and with a metallocene polyethylene, and the like.

The second layer of the film structure according to the present invention, which in an embodiment is a skin layer around the core layer described above, comprises a single-site catalyzed polyethylene such as metallocene polyethylene (mPE). In a preferred embodiment, the mPE is a linear low density polyethylene (hereinafter "mLLDPE"). In another preferred embodiment the mPE is a VLDPE (hereinafter "mVLDPE") having a density of between about 0.880 to 0.915 g/cm³. In the case where the HDPE component of the blend is also a metallocene polyethylene, the second component of the invention must be a mLLDPE or the aforementioned mVLDPE.

A "metallocene polyethylene" as used herein means a polyethylene produced by a metallocene catalyst. As used herein, the term "metallocene catalyst" is defined to be at least one metallocene catalyst component containing one or more substituted or unsubstituted cyclopentadienyl moiety (Cp) in combination with a Group 4, 5, or 6 transition metal (M).

The metallocene catalyst precursors generally require activation with a suitable co-catalyst, or activator, in order to yield an "active metallocene catalyst", i.e., an organometallic complex with a vacant coordination site that can coordinate, insert, and polymerize olefins. The active catalyst systems generally includes not only the metallocene complex, but also an activator, such as an alumoxane or a derivative thereof (preferably MAO), an ionizing activator, a Lewis acid, or a combination thereof. Alkylalumoxanes are additionally suitable as catalyst activators. The catalyst system is preferably supported on a carrier, typically an inorganic oxide or chloride or a resinous material such as polyethylene.

The prior art is replete with examples of metallocene catalysts/systems for producing polyethylene. Non-limiting examples of metallocene catalysts and catalyst systems useful in practicing the present invention include WO 96/11961; WO 96/11960; U.S. Pat. Nos. 4,808,561; 5,017,714; 5,055,438; 5,064,802; 5,124,418; 5,153,157; 5,324,800; more recent examples are U.S. Pat. Nos. 6,380,122; and 6,376,410; and WO01/98409, and references cited therein. Included within the definition of mPE resins, and more particularly mLLDPE resins, for the purpose of the present invention, are polyethylene resins having a low polydispersity as described, for instance, in the aforementioned U.S. Pat. No. 6,492,010, that is, a polydispersity produced by a catalyst variously described as single site, constrained geometry, or metallocene catalyst, catalysts per se well known in the prior art. Preferred low polydispersity mPEs are mLLDPEs having a density within the range for LLDPEs as set forth herein. The low polydispersity mLLDPE resins may be prepared from a partially crystalline polyethylene resin that is a polymer prepared with ethylene, preferably ethylene and at least one alpha olefin monomer, e.g., a copolymer or terpolymer. The alpha olefin monomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene.

In an embodiment, low polydispersity resins will have average molecular weights in the range of from about 20,000 to about 500,000, preferably from about 50,000 to about 200,000. The molecular weight is determined by commonly used techniques such as size exclusion chromatography or gel permeation chromatography.

In an embodiment, the low polydispersity polymer will have a molecular weight distribution, or polydispersity, (Mw/Mn, "MWD") within the range of about 1 to about 4, preferably about 1.5 to about 4, more preferably about 2 to about 4, and even more preferably from about 2 to about 3. Such products are well known in the art per se and are discussed in U.S. Pat. Nos. 5,907,942; 5,907,943; 5,902,684; 5,752,362; 5,814,399; and 5,749,202.

In an embodiment, the low polydispersity polymers thus produced generally have a crystalline content in excess of at least 10 weight percent, generally in excess of at least 15 weight percent.

Preferred mLLDPE resins will be characterized by one or more of the aforementioned embodiments, including preferred, more preferred, etc. As a non-limiting limiting example, a preferred mLLDPE according to the present invention is characterized as having a molecular weight of from 20,000 to 500,000 and a polydispersity of from about 2 to about 4; another preferred mLLDPE according to the present invention is characterized as having a polydispersity of from about 1 to about 4 and a crystalline content in excess of at least 10 wt. %.

Useful low polydispersity or mLLDPE polymers are available from, among others, Dow Chemical Company and Exxon Chemical Company who are producers of single site or constrained geometry catalyzed polyethylenes. These resins are commercially available as the ENHANCED POLYETHYLENE™, ELITE™, AFFINITY™, EXXACT™, and EXCEED™ polyethylene resins.

Also included within the definition of mLLDPE according to the present invention are bimodal resins produced by catalysts having as at least one component a single site or constrained geometry catalyst which produces a low polydispersity polymer. Particularly preferred examples are bimodal resins having as a component a resin produced using a single site, constrained geometry, or metallocene catalyst and having a density falling within the density range for LLDPE as previously described. Bimodal resins are per se well known in the art.

In a more preferred embodiment, useful mPE suitable for the present invention include metallocene LLDPE (mLLDPE) under the Exceed™ trademark, available from ExxonMobil Chemical Company, Houston, Tex. Particularly preferred is Exceed™ 1327CA polyethylene and Exceed™ 1018CA polyethylene, both commercially available mLLDPEs with a $C_6$ comonomer incorporated and produced in the gas phase.

In an embodiment, a blend suitable for the second layer or skin layer(s) of the film structure should comprise from between about 100 wt. % and 50 wt. % of mPE. Preferably the mPE has a density range of from 0.910 to 0.940 g/cm$^3$ and more preferably 0.915 to 0.940 g/cm$^3$, still more preferably 0.921 to 0.934 g/cm$^3$, yet still more preferably 0.925 to 0.929 g/cm$^3$.

Optional components, in the amount of no more than 50 wt. %, include LDPE and/or HDPE. Preferred LDPEs and HDPE as far as density ranges are those set forth elsewhere in the present application. Preferred embodiments are also preferably selected from the commercially available or known LDPEs or HDPEs discussed herein. In another preferred embodiment, LDPEs suitable for use in this second layer are free-radical initiated LDPEs having a density in the range of 0.916 to 0.940 g/cm$^3$, preferably 0.924 to 0.940 g/cm$^3$. In an embodiment, the LDPE blended with the HDPE in this layer has a density in the range of 0.916 to 0.940 g/cm$^3$, more preferably 0.921 to 0.935 g/cm$^3$. In another embodiment, the LDPE blended with the HDPE in this layer has a density in the range of 0.916 to 0.927 g/cm$^3$, and more preferably 0.921 to 0.926 g/cm$^3$. Again, preferred specific examples of LDPEs are LD170BA and experimental grades EX489BA and EX514BA, mentioned above. Blends of two or more LDPEs are contemplated. The LDPE used in this second layer, if at all, may be the same or different as the LDPE used in the first layer.

Particularly preferred HDPE in this second layer include HDPEs available from ExxonMobil Chemical Co., Houston, Tex., under the HD, HDA, HMA, HRA, HRP, HDZ or HYA series or under the trademark PAXON, particularly HYA800 and HDZ222, discussed above. Blends of two or more HDPE polymers in this layer are also contemplated.

In the case where HDPE is present in the second layer or skin layer, it may be the same or different than the HDPE in the first layer. Thus, the HDPE polymer has a density of greater than 0.940 g/cm$^3$. In a preferred embodiment the HDPE in this layer has a density of from about 0.940 g/cm to about 0.970 g/cm$^3$, more preferably from about 0.955 g/cm$^3$ to about 0.965 g/cm$^3$, and most preferably from about 0.960 g/cm$^3$ to about 0.965 g/cm$^3$. This second layer may include various additives, as discussed in more detail below. However, it is preferred that this second layer, comprising mPE and optionally HDPE and/or LDPE, does not contain slip or antiblock additives.

Additionally, in embodiments this second or skin layer may include or exclude one or more of the following: additional polyolefins such as VLDPE or polypropylene, slip or antiblock agents, and the like.

Multilayer film forming techniques are well-known to one of ordinary skill in the art and the prior art is replete with examples; see, for instance, WO01/98409. Any of these techniques may be used to form multilayer films according to the present invention, but coextrusion is most preferred and provides the greatest advantage of the invention as regards collation shrink film structures. Cast films are also envisioned, particularly in the case wherein at least one skin layer, as described more fully below, comprises polypropylene.

While those of skill in the art will appreciate that the thickness of layers may be adjusted based on the desired end use, one of the surprising aspects of the present invention is that the composition of the layers of the present invention provide for multilayer films having the appropriate properties for collation shrink while being of sufficiently thin gauge to be commercially attractive.

Thus, according to one embodiment of the invention, the first layer comprising HDPE, as described above, and the second layer comprising mPE, is coextruded to form a multilayer film useful as collation shrink film. In the preferred collation shrink wrapped structure the second layer comprising the metallocene polyethylene is the outside layer with the first layer comprising HDPE in contact with the items shrink-wrapped.

In an embodiment the film according to the invention consists essentially of the first layer comprising HDPE and the second layer comprising mPE. In a more preferred embodiment, the first layer is about 30 microns thick and the second layer is about 5 microns thick.

In another embodiment, the first layer comprising HDPE, described above, is a core layer between two skin layers, at least one of which is the second layer, comprising mPE, described above. The two skin layers may be the same or different, provided that at least one is a second layer, as described above, comprising mPE. In this embodiment, it is preferred that both skin layers also comprise mPE.

As used herein, the term "skin layer" means that the layer is the outer layer of the structure. Thus, in a three-layer structure there are two skin layers and a core layer, sandwiched by the skin layers. This structure will be denoted A/B/A, wherein the A layer denotes a skin layer, corresponding to the second layer comprising mPE, above, and the B layer denotes the core layer, corresponding to the first layer described above. It will be recognized that the A layers do not need to be identical, however.

In still another embodiment, the structure includes a layer comprising HDPE without a metallocene polyethylene component, and a layer comprising a blend comprising metallocene polyethylene and HDPE. Optionally, the layer comprising HDPE without a metallocene polyethylene component is sandwiched between two skin layers comprising mLLDPE wherein at least one of the skin layers further comprises HDPE. The skin layers in any of these "skin and core" (or A/B/A) embodiments may be the same or different.

Additional film layers are contemplated, e.g., between one or both of A/B, e.g. as tie-layers. However, in the preferred embodiment the core layer B comprises HDPE and the skin layers A comprise mPE (i.e., corresponding to one of the first layers and two of the second layers, respectively, described above). The final film comprising the A/B/A structure may be symmetrical or it may be unsymmetrical.

In a more preferred embodiment the film according to the present invention comprises the A/B/A structure, wherein the A skin layers, which may be the same or different, each independently comprise an mPE having a density of between about 0.910 to 0.940 g/cm$^3$, preferably 0.915 to 0.940 g/cm$^3$, and optionally an HDPE, preferably having a density of between about 0.940 and 0.970 g/cm$^3$, more preferably 0.955 to about 0.965 g/cm$^3$, and most preferably from about 0.960 to about 0.965 g/cm$^3$, and the B core layer comprises an HDPE, preferably having a density of between about 0.940 and 0.970 g/cm$^3$, more preferably 0.955 to about 0.965 g/cm$^3$, and most preferably from about 0.960 to about 0.965 g/cm$^3$, and an LDPE, preferably having a density in the range of 0.916 to 0.935 g/cm$^3$, more preferably 0.921 to 0.930 g/cm$^3$. In the case where there is HDPE in one or both of the skin layers, the HDPE in each layer is independently selected and it may be the same or different from the other layer and/or the core layer.

In this preferred A/B/A structure, it is more preferred that the core layer B comprise 60-90 wt. %, more preferably 70-80 wt. % LDPE, and 40-10 wt. % HDPE, more preferably 30-20 wt. %, and that the skin layers A are each independently selected from 80-100 wt. %, preferably 85-95 wt. % mPE, and 20-0 wt. % HDPE, more preferably 15-5 wt. %. In a preferred embodiment the A/B/A structure is symmetrical with respect to composition and thickness. In another preferred embodiment the A/B/A structure is no thicker than 50 microns and more preferably about 40 microns thick or less.

In another preferred embodiment, in a structure comprising A/B/A layers according to the present invention, the A skin layers each independently comprise at least one mLLDPE resin and at least one LDPE resin, and the B core layer comprises at least one LDPE resin and at least one HDPE resin. One or more additional layers may be present between the skin layers and the core, and the structure may be unsymmetrical or symmetrical so that, for instance, an embodiment includes a structure consisting of an A layer, tie layer, B layer, tie layer, A layer, a structure consisting of an A layer, tie layer, B layer, A layer, and the like. A preferred embodiment is the case where the structure consists essentially of an A layer, a B layer, A layer having a total thickness of 2 mils (50 microns±10 microns), the layers being in the ratio, respectively, of about 15:70:15. In another preferred embodiment, the A layers comprise from about 99 to about 80 wt. %, preferably from about 98 to about 90 wt. % mLLDPE and from about 1 to about 20 wt. %, preferably from about 2 to about 10 wt. % LDPE. In another preferred embodiment, the B layer comprises from about 90 to about 50 wt. %, preferably from about 85 to about 55 wt. %, more preferably from about 85 to about 75 wt. % LDPE, and from about 10 to about 50 wt. %, preferably from about 15 to about 45 wt. %, more preferably 15 to about 25 wt. % HDPE. Additional preferred embodiments include combinations of the aforementioned embodiments, preferred embodiments and more preferred embodiment, as well as the preferred and more preferred densities for each of the prospective polyethylenes in this layer as described in the appropriate sections herein. Each of the aforementioned layers may, independently, include or exclude additional ingredients such as slip or antiblock agents and/or additional polyolefins such as polypropylene and/or VLDPEs. A particularly advantageous embodiment as an A/B/A structure as described in this paragraph wherein one of the A layers does not contain polypropylene and one of the A layers does contain polypropylene. In a preferred collation shrink wrapped structure, the layer having the polypropylene would be in contact with the at least one item collation shrink wrapped.

In yet another embodiment, which may be a modification of any of the previous embodiments, the second layer or at least one of the skin layers comprises an mLLDPE, an HDPE, and an LDPE.

In still another embodiment, the structure comprises a skin layer comprising an mPE according to the present invention, a core layer comprising HDPE according to the present invention, and a second skin layer comprising polypropylene.

In a preferred embodiment, one or more of the layers of the multilayer film structure according to the invention may have certain additives, such as thermal stabilizers, but in this preferred embodiment each of the compositions of the various layers should specifically exclude slip or antiblock additives. Suitable additives include: fillers such as silica, talc, and the like; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives and anti-static additives; tackifiers, such as polybutenes, terpene resins, aliphatic and aromatic hydrocarbon resins, alkali metal and glycerol, stearates and hydrogenated rosins; UV stabilizers; heat stabilizers; release agents; anti-static agents; pigments; colorants; dyes; waxes; and the like.

Any blending required to make the compositions for the layers according to the present invention can be formed using conventional equipment and methods, such as by dry blending the individual components and subsequently melt mixing in a mixer, or by mixing the components together directly in a mixer, such as a Banbury mixer, a Haake mixer, a Brabender internal mixer, or a single or twin-screw extruder including a compounding extruder and a side-arm extruder used directly downstream of a polymerization process or prior to film extrusion.

EXAMPLES

In the following examples, three-layer, A/B/A, films according to the invention and comparative films were produced on a commercially available extruder from Winmoller & Holscher. The co-extruded structures were symmetrical, having an inner core of 30 microns thick and two skins layers each 5 microns thick. Machine conditions were as follows: (a) die diameter: 250 mm; (b) die gap: 1.4 mm; (c) blow-up ratio: 3.0; (d) core extruder adapter temperature: 200° C.; (e) skin extruder adapter temperature setting: 190° C.; (f) die temperature: 200° C.

The various products used in the examples of Table 2 are identified below in Table 1:

TABLE 1

| Product | Density | MI[3] | Comments |
|---|---|---|---|
| [1]HYA800 | 0.961 | 0.7 | HDPE Gas Phase |
| [1]HDZ222 | 0.964 | 2.4 | Bimodal HDPE |
| [1]LL1201XV | 0.9255 | 0.7 | Ziegler-Natta LLDPE C$_4$ Gas Phase |
| [1]Exceed 1327CA | 0.927 | 1.3 | Metallocene LLDPEC$_6$ Gas Phase |
| [1]Exceed 1018CA | 0.918 | 1.0 | Metallocene LLDPE C$_6$ Gas Phase |
| [2]EX489BA | 0.9285 | 0.55 | LDPE High Pressure |
| [2]EX514BA | 0.9285 | 0.35 | LDPE High Pressure |

[1]Commercially available from ExxonMobil
[2]Development versions. Improved versus commercially available as LD170BA.
[3]ASTM D-1238, condition E (2.16 kg load, 190 C)

Films having a thickness of 40 microns were formed using the compositions given in Table 2. Examples 2-3, 5-6, 8-9 are examples of the present invention having skin layers comprising mPE and HDPE, and core layers comprising HDPE. Examples 11-12, 14-15, and 17-20 are examples of the present invention having skin layers comprising mPE but no HDPE, with the core layers comprising HDPE. The other examples are for comparative purposes. The results of various tests performed are shown in Table 3.

Haze is total haze measured according to ASTM D1003; Gloss 60° angle and Gloss 20° angle are both measured in accordance with ASTM D2457; Clarity is measured in accordance with ASTM D1746; the Elmendorf Tear values are both measured in accordance with ASTM D1922; Thermal Force values are both measured in accordance with ASTM D2838-95, set temperature: 190° C.; relative 1% secant modulus and 10% offset yield are both measured in accordance with ASTM D882. Thermal force is measured based on ASTM D2838-95 procedure A using a Retramat tester supplied by Prodemat S.A.

In the case of the skins comprising metallocene polyethylene and LDPE and the core comprising HDPE (examples 11-12, 14-15, 17-21), the 1% secant Modulus MD and TD values are significantly higher than the case where there is no HDPE in the core layer (examples 10, 13, 16, 22). Among other things, 1% secant Modulus provides a measure of the down-gauging possible using these films. The higher the 1%

TABLE 2

| Str. | Thickness | Composition Skin Layers | | | | Composition Middle Layer | | | | Core extruder Melt pressure (Mpa) | Core extruder motor power (% of max) |
|---|---|---|---|---|---|---|---|---|---|---|---|
| | | Ratio | Product | Ratio | Product | Ratio | Product | Ratio | Product | | |
| 1  | 40 µm | 95% | 1327CA  | 5%  | HYA800  | 80% | EX489BA | 20% | LL1201XV | 327 | 32% |
| 2  | 40 µm | 95% | 1327CA  | 5%  | HYA800  | 80% | EX489BA | 20% | HYA800   | 291 | 31% |
| 3  | 40 µm | 95% | 1327CA  | 5%  | HDZ222  | 80% | EX489BA | 20% | HDZ222   | 273 | 33% |
| 4  | 40 µm | 95% | 1327CA  | 5%  | HYA800  | 70% | EX489BA | 30% | LL1201XV | 350 | 33% |
| 5  | 40 µm | 95% | 1327CA  | 5%  | HYA800  | 70% | EX489BA | 30% | HYA800   | 292 | 30% |
| 6  | 40 µm | 95% | 1327CA  | 5%  | HDZ222  | 70% | EX489BA | 30% | HDZ222   | 271 | 29% |
| 7  | 40 µm | 95% | 1327CA  | 5%  | HYA800  | 60% | EX489BA | 40% | LL1201XV | 367 | 35% |
| 8  | 40 µm | 95% | 1327CA  | 5%  | HYA800  | 60% | EX489BA | 40% | HYA800   | 306 | 31% |
| 9  | 40 µm | 95% | 1327CA  | 5%  | HDZ222  | 60% | EX489BA | 40% | HDZ222   | 271 | 29% |
| 10 | 40 µm | 85% | 1327CA  | 15% | EX489BA | 80% | EX489BA | 20% | LL1201XV | 332 | 32% |
| 11 | 40 µm | 85% | 1327CA  | 15% | EX489BA | 80% | EX489BA | 20% | HYA800   | 291 | 30% |
| 12 | 40 µm | 85% | 1327CA  | 15% | EX489BA | 80% | EX489BA | 20% | HDZ222   | 276 | 29% |
| 13 | 40 µm | 85% | 1327CA  | 15% | EX489BA | 70% | EX489BA | 30% | LL1201XV | 353 | 34% |
| 14 | 40 µm | 85% | 1327CA  | 15% | EX489BA | 70% | EX489BA | 30% | HYA800   | 298 | 30% |
| 15 | 40 µm | 85% | 1327CA  | 15% | EX489BA | 70% | EX489BA | 30% | HDZ222   | 275 | 30% |
| 16 | 40 µm | 85% | 1327CA  | 15% | EX489BA | 60% | EX489BA | 40% | LL1201XV | 367 | 35% |
| 17 | 40 µm | 85% | 1327CA  | 15% | EX489BA | 60% | EX489BA | 40% | HYA800   | 304 | 32% |
| 18 | 40 µm | 85% | 1327CA  | 15% | EX489BA | 60% | EX489BA | 40% | HDZ222   | 272 | 30% |
| 19 | 40 µm | 85% | 1327CA  | 15% | EX514BA | 70% | EX514BA | 30% | HDZ222   | 294 | 32% |
| 20 | 40 µm | 85% | 1018CA  | 15% | EX489BA | 70% | EX489BA | 30% | HDZ222   | 281 | 30% |
| 22 | 40 µm | 85% | LL1201XV | 15% | EX489BA | 70% | EX489BA | 30% | LL1201XV | 341 | 32% |

TABLE 3

| Run | 1 | 2 | 3 | 4 | 5 | 6 | 7 | 8 | 9 | 10 | 11 |
|---|---|---|---|---|---|---|---|---|---|---|---|
| Haze | 9.6 | 5.6 | 5 | 9.6 | 6.2 | 6 | 10.9 | 7.5 | 6.8 | 4 | 4.4 |
| Gloss 60°% | 10 | 13 | 13.6 | 9.5 | 12.9 | 13.5 | 9.8 | 12.3 | 13.2 | 13.4 | 13.5 |
| Gloss 20°% | 5.4 | 11.5 | 13.5 | 5.9 | 10.5 | 12.8 | 6.5 | 10.4 | 12.5 | 12.6 | 11.4 |
| 1% sec. mod. MD MPa | 339 | 449 | 429 | 340 | 493 | 492 | 338 | 547 | 564 | 334 | 380 |
| 1% sec. mod TD MPa | 367 | 512 | 516 | 362 | 544 | 555 | 376 | 633 | 672 | 391 | 459 |
| Clarity % | 80 | 77 | 93 | 76 | 74 | 81 | 80 | 74 | 87 | 89 | 82 |
| Elmendorf MD gr/µm | 5.9 | 14.2 | 9.3 | 4.3 | 10.2 | 9.1 | 2.3 | 4.7 | 0.9 | 5.5 | 7.1 |
| Elmendorf TD gr/µm | 6 | 7.3 | 7.9 | 8.3 | 9.1 | 9.9 | 10 | 12 | 12.5 | 6.6 | 1.4 |
| Thermal force MD N/15 mm | .07 | 1.26 | 1.31 | 1.04 | 1.4 | 1.55 | 0.98 | 1.74 | 1.76 | 1.01 | 1.3 |
| 10% offset yield MD MPa | 14.8 | 17.4 | 16.8 | 15.0 | 18.2 | 18.2 | 15.0 | 19.1 | 19.1 | 14.7 | 16.2 |
| 10% offset yield TD MPa | 14.4 | 17.4 | 16.9 | 14.6 | 17.7 | 18.7 | 14.6 | 18.9 | 20.0 | 14.6 | 16.1 |

| Run | 12 | 13 | 14 | 15 | 16 | 17 | 18 | 19 | 20 | 22 |
|---|---|---|---|---|---|---|---|---|---|---|
| Haze | 4.4 | 4.5 | 4.9 | 5.1 | 4.8 | 5.9 | 5.8 | 5.20. | 4.90. | 5.20. |
| Gloss 60°% | 13.6 | 13.3 | 13.5 | 13.5 | 13.1 | 12.9 | 13.4 | 12.560. | 13.540. | 12.250. |
| Gloss 20°% | 13.2 | 12.6 | 12.7 | 13 | 11.7 | 10.3 | 12.8 | 10.70. | 13.30. | 10.30. |
| 1% sec. mod. MD MPa | 409 | 329 | 444 | 471 | 327 | 488 | 539 | 426.0. | 451.0. | 322.0. |
| 1% sec. mod TD MPa | 505 | 382 | 505 | 571 | 385 | 583 | 674 | 543.0. | 517.0. | 371.0. |
| Clarity % | 81 | 74 | 78 | 92 | 85 | 67 | 89 | 83.0 | 85.0. | 83.0. |
| Elmendorf MD gr/µm | 13.4 | 4.6 | 11 | 10.6 | 9.8 | 3.6 | 2.3 | 15.440. | 3.960. | 5.560. |
| Elmendorf TD gr/µm | 8 | 7.7 | 10 | 9.5 | 5.6 | 11.9 | 11.9 | 7.910. | 12.790. | 7.520. |
| Thermal force MF N/15 mm | 1.42 | 0.99 | 1.49 | 1.54 | 1 | 1.57 | 1.69 | 1.673. | 1.498. | 1.0. |
| 10% offset yield MD MPa | 16.2 | 14.4 | 17.0 | 17.2 | 14.3 | 18.0 | 18.4 | 16.7 | 16.5 | 14.1 |
| 10% offset yield TD MPa | 16.7 | 14.7 | 16.9 | 17.8 | 14.5 | 18.6 | 18.9 | 17.3 | 16.4 | 14.2 |

Several advantages can be seen in the present invention, according to the examples. For instance, melt pressure of the core extruder drop when the HDPE grades are used in the core as compared to the LLDPE grades (examples 2-3, 5-6, 8-9, 11-12, 14-15, 17-20 versus 1, 4, 7, 10, 13, 16, 22).

secant Modulus, the lower the gauge (thickness of the film) required to provide the same benefit. Increase in yield strength as measured by 10% offset yield is also a benefit which opens down-gauging possibilities. A thinner material having the same stiffness and strength (and thus lower cost) is highly sought after.

Likewise, skins comprised of blends of metallocene polyethylene and HDPE sandwiching a core comprising HDPE (examples 2-3, 5-6, and 8-9) had superior 1% secant Modulus relative to examples having cores not containing HDPE (examples 1, 4, and 7).

Furthermore, as is apparent from an inspection of the optical properties, the increase in strength and/or downgauging which accompanies the presence of HDPE in the core and/or skin is not significantly offset by loss of clarity or gloss values. Indeed it is particularly remarkable that Gloss at 20° and 60° are quite similar for examples according to the present invention, particularly with respect to the examples having HDPE both in the core and skins relative to the examples having HDPE in the skin but not the core. A small difference in Gloss 20° and 60° is important for display purposes, i.e., the angle of observance is not important. In Table 3, for instance, it can be seen that the difference in Gloss 20° and 60° values is about 0.1%, which is negligible. Typically for examples of the present invention differences of 2% are observed.

Moreover, examples according to the invention uniformly exhibit superior Elmendorf tear values (higher number being a measure of higher resistance to tearing) and higher thermal force (a measure of holding force when shrink wrapped about collated items).

Example 23

A film having an A/B/A structure of 2 mil thickness with a thickness ratio, respectively, of 15:70:15, was produced on a commercial Maachi™ coextrusion line. The A layers consisted of about 95 wt. % Exceed 1327CA and about 5 wt. % LD514. The B layer consisted of about 80 wt. % LD514BA and about 20 wt. % HDZ222.

Example 24

A film identical to the above, except that HDZ222 was substituted for the LD514, was produced in the same manner.

A comparison of Examples 23 and 24 illustrates that a combination of an mLLDPE and LDPE as the skin layer in this particular case results in a reduction in COF of about 15%, a modest increase in gloss, and a reduction in haze from 10.4 in Example 24 to 5.9 in Example 23.

The invention has been described above with reference to numerous embodiments and specific examples. Many variations will suggest themselves to those skilled in this art in light of the above detailed description. All such obvious variations are within the full intended scope of the appended claims.

A preferred embodiment is a multilayer film structure having at least one first layer comprising HDPE and at least one second layer, different from said first layer, comprising a metallocene polyethylene; also more preferred embodiments, which may be combined where suitable, as would be recognized by one of skill in the art in possession of the present disclosure without undue experimentation: wherein said metallocene polyethylene is an mLLDPE; wherein said first layer further comprises LDPE in the amount of at least 50 wt. %, based on the composition of the first layer; wherein said second layer further comprises at least one additional polyolefin selected from group consisting of HDPE, LDPE, and mixtures thereof, in the amount of between 0.1 wt. % and 50 wt. %; wherein said first layer comprising HDPE is a core layer, said second layer comprising a metallocene polyethylene is a skin layer, and further comprising a second skin layer; wherein said first layer comprising HDPE is a core layer, said second layer comprising a metallocene polyethylene is a skin layer, and further comprising a second skin layer, said second skin layer comprising a metallocene polyethylene, which may be the same or different from the first skin layer; wherein said first layer comprising HDPE is a core layer, said second layer comprising a metallocene polyethylene is a skin layer, and further comprising a second skin layer, said second skin layer comprising an mLLDPE; wherein said first layer comprising HDPE is a core layer, said second layer comprising a metallocene polyethylene is a skin layer, and further comprising a second skin layer, said second skin layer comprising an mLLDPE and further comprising at least one additional polyolefin selected from group consisting of HDPE, LDPE, and mixtures thereof, in the amount of between 0.1 wt. % and 50 wt. %; wherein said second skin comprises an mLLDPE and further comprises a polyolefin selected from HDPE, LDPE, and mixtures thereof, in the amount of between 0.1 wt. % and 50 wt. %; wherein none of the layers contain slip or antiblock additives; any of the three or more layer structures wherein the total thickness is 70 microns or less, 60 microns or less, 50 microns or less, preferably 40 microns or less, or even more preferably wherein said first layer comprising HDPE has a thickness of about 40 microns or less, preferably 30 microns or less and each of said skin layers has a thickness of about 10 microns or less, preferably 5 microns or less; and preferably wherein the ratio of layers in the A/B/A structure described herein is in the range of, respectively, (15±5):(70±10):(15±5), wherein the structure is symmetrical or unsymmetrical with regard to one or more of composition, dimensions, additional layers, and the like, e.g., wherein the composition of the skin layers is identical or different, wherein there are additional layers, such as tie layers, between none, one or both of the A/B interfaces, wherein the ratio of layers A/B/A is 15:70:15, 20/70/10, etc.

Another preferred embodiment is a film comprising an A/B/A structure, wherein the A layers are skin layers, which may be the same or different, each independently are selected from a blend comprising an mPE having a density of between about 0.910 to 0.940 g/cm$^3$, preferably 0.915 to 0.940 g/cm$^3$, and optionally an HDPE, which if present, preferably has a density of between about 0.940 and 0.970 g/cm$^3$, more preferably 0.955 to about 0.965 g/cm$^3$, and most preferably from about 0.960 to about 0.965 g/cm$^3$, and/or optionally an LDPE, which if present, preferably has a density of from about 0.924 to about 0.940 g/cm$^3$, or about 0.916 to about 0.935 g/cm$^3$, or about 0.926 to about 0.935 g/cm$^3$, or about 0.916 to about 0.927 g/cm$^3$, or about 0.921 to about 0.926 g/cm$^3$, or about 0.925 g/cm$^3$ to about 0.930 g/cm$^3$ 0.916 to 0.940 g/cm$^3$, or about 0.924 to 0.935, and other embodiments including LDPEs having densities from any of the lower density limits specified to any of the higher density limits specified herein, for example, 0.921 to 0.940 g/cm$^3$, 0.926 to 0.940 g/cm$^3$, or 0.925 to 0.935 g/cm$^3$ and the B is a core layer comprising a blend comprising an HDPE, preferably having a density of between about 0.940 and 0.970 g/cm$^3$, more preferably 0.955 to about 0.965 g/cm$^3$, and most preferably from about 0.960 to about 0.965 g/cm$^3$, and an LDPE, preferably having a density in the range of 0.916 to 0.935 g/cm$^3$, more preferably 0.925 to 0.930 g/cm$^3$, and also including density ranges set forth previously for the one or more skin layer(s) and also more preferred embodiments of this A/B/A structure, wherein core layer B comprise 60-90 wt. %, more preferably 70-80 wt. % LDPE, and 40-10 wt. % HDPE, more preferably 30-20 wt. %, and skin layers A are each independently selected from 80-100 wt. %, preferably 85-95 wt. % mPE, and 20-0 wt. % HDPE, LDPE, or mixtures thereof, more preferably 15-5 wt. %; and a more preferred embodiment of any of the above embodiments wherein said layers A and layer B, when formed into a coextruded structure A/B/A having a total thickness of less than 60 microns or less than 50 microns, has a 1% secant Modulus MD of at least 335 mPa, preferably 400 mPa, more preferably 500 mPa, and a 1% secant Modulus TD of at least 335 mPa, preferably 400 mPa, more preferably 500 mPa, and still more preferably 600 mPa, the secant Modulus values measure in accordance with ASTM D882; and also any of the above embodiments wherein layers A and layer B, when formed into a coextruded structure A/B/A having a total thickness of less than 50 microns, has a difference in Gloss 20° and 60° of 2% or less, the Gloss values measured in accordance with ASTM D2457.

Additional preferred embodiments of any of the above would include the films having one or more of the performance parameters noted above in the experimental section, and would also include films having additional layers, such as A/B/C/D/E, wherein the skin layers A and E, which may be the same or different, corresponding to the composition set forth above for skin layer A in the A/B/A structure or wherein A corresponds to the skin layer A and E corresponds to a layer comprising polypropylene, the composition C corresponds to the composition set forth above for core layer B in the A/B/A structure, and B and D, which may be the same or different, correspond to layers which may be selected from, without intending to be limiting, tie layers, reprocessed material layers and, in a preferred embodiment, additional layers having the composition corresponding to layer B in the A/B/A structure described previously.

In an embodiment, the structure comprising A/B/A layers as herein describe does not contain an oxygen barrier layer in the structure. However, one of the particularly beneficial uses of the collation shrink comprising the A/B/A layers according to the present invention is to overwrap items having a primary oxygen barrier layer, e.g., perishable items such as meats. Typical primary oxygen barriers are discussed in WO 95/00333 recited above, such as vinylidene chloride copolymer, and may also include ethylene vinyl alcohol copolymers (EVOH copolymers).

Other preferred embodiments are coextruded films, heat shrinkable films, cast films, blown films, and collation shrink-wrapped structures according to any of the preceding embodiments (including preferred embodiments, more preferred embodiments, etc.).

Trade names used herein are indicated by a ™ symbol or ® symbol, indicating that the names may be protected by certain trademark rights, e.g., they may be registered trademarks in various jurisdictions. All patents and patent applications, test procedures (such as ASTM methods, and the like), and other documents cited herein are fully incorporated by reference to the extent such disclosure is not inconsistent with this invention and for all jurisdictions in which such incorporation is permitted.

What is claimed is:

1. A film having two outer skin layers, each independently selected from a composition comprising:
    (a) 85-95 wt. % mLLDPE; and
    (b) 5-15 wt. % of HDPE, LDPE, or a mixture thereof, a core layer comprising 60-90 wt. % LDPE and 40-10 wt. % HDPE,
and wherein the film is no thicker than 50 microns.

2. A film having two outer skin layers, which may be the same or different, each comprising:
    (a) an mPE prepared from ethylene and at least one $C_3$ to $C_{12}$ alpha-olefin monomer and having a density of between about 0.910 g/cm$^3$ to about 0.940 g/cm$^3$; and
    (b) HDPE, LDPE, or both, said HDPE having a density of between 0.940 and 0.970 g/cm$^3$, and
    a core layer comprising a blend comprising 60-90 wt. % LDPE and 40-10 wt. % HDPE,
and wherein the film is no thicker than 50 microns.

3. The film according to claim 1, wherein said mLLDPE has a density of between 0.915 to 0.940 g/cm$^3$.

4. The film according to claim 1, wherein the HDPE in said core layer has a density of between 0.940 and 0.970 g/cm$^3$.

5. The film according to claim 1, wherein said LDPE has a density of between about 0.916 to 0.935 g/cm$^3$.

6. The film according to claim 1, wherein said two outer skin layers and said core layer, when formed into a coextruded structure having a total thickness of less than 50 microns, has a 1% secant Modulus MD of at least 400 mPa, and a 1% secant Modulus TD of at least 400 mPa, both measured in accordance with ASTM D882.

7. The film according to claim 6, wherein the 1% secant Modulus MD is at least 500 mPa, and the 1% secant Modulus TD is at least 500 mPa, measured in accordance with ASTM D882.

8. The film according to claim 1, wherein the core layer comprises 70-80 wt. % LDPE and 30-20 wt. % HDPE, and the skin layers are each independently selected from a blend comprising 85-95 wt. % mLLDPE and 15-5 wt. % LDPE.

9. The film according to claim 1, wherein each of said two outer skin layers and said core layer have a total thickness of less than 50 microns, a difference in Gloss 20° and 60° of 2% or less, where the Gloss values are measured in accordance with ASTM D2457.

10. The film according to claim 1, further comprising at least one layer between at least one of said outer skin and core layers, said at least one layer selected from the group consisting of a tie layer, a reprocessed material layer, and a layer selected from blends comprising an HDPE and an LDPE.

11. A coextruded, heat-shrinkable film according to claim 1.

12. A collation shrink-wrapped structure comprising a group of items wrapped by means of a film according to claim 1.

13. A process for making a packaged structure, comprising wrapping a package with the film according to claim 1, and heating the wrapped package to shrink the film and apply a holding force to the structure.

14. The film according to claim 2, wherein at least one of said outer skin layers comprises HDPE and LDPE, said LDPE present in an amount of from 2 to 10 wt %, said HDPE having a density of between 0.960 to 0.965 g/cm$^3$.

15. The film according to claim 1, wherein said LDPE has a density of between 0.925 to 0.935 g/cm$^3$.

16. The film according to claim 2, wherein said mPE is an mLLDPE having a density of from about 0.918 to about 0.927 g/cm$^3$.

17. The film according to claim 16, wherein at least one of said outer skin layers further comprises an HDPE having a density of from about 0.940 to about 0.970 g/cm$^3$.

18. The film according to claim 16, wherein the HDPE in said core layer has a density of from about 0.940 to about 0.970 g/cm$^3$.

19. The film according to claim 16, wherein said LDPE has a density of from about 0.916 to about 0.935 g/cm$^3$.

20. The film according to claim 16, wherein the core layer comprises 70-80 wt. % LDPE and 30-20 wt. % HDPE, and the skin layers are each independently selected from a blend comprising 85-95 wt. % mPE and 15-5 wt. % LDPE.

21. The film according to claim 16, wherein the outer skin layers and core layer, when formed into a coextruded structure having a total thickness of less than 50 microns, has a 1% secant Modulus MD of at least 400 MPa, and a 1% secant Modulus TD of at least 400 MPa, both measured in accordance with ASTM D882.

22. The film according to claim 21, wherein the coextruded structure has a 1% secant Modulus TD of at least 600 MPa, measured in accordance with ASTM D882.

23. The film according to claim 16, wherein said outer skin layers and core layer, when formed into a coextruded structure having a total thickness of less than 50 microns, has a difference in Gloss 20° and 60° of 2% or less, the Gloss values measured in accordance with ASTM D2457.

24. The film according to claim 16, further comprising at least one layer between at least one of said outer skin and core layers, said at least one layer selected from the group consisting of a tie layer, a reprocessed material layer, and a layer selected from blends comprising an HDPE and an LDPE.

25. A coextruded, heat shrinkable film according to claim 16.

26. A collation shrink-wrapped structure comprising a group of items wrapped by means of a film according to claim 16.

27. The film of claim 1, wherein the mLLDPE is prepared from ethylene and at least one $C_3$ to $C_{12}$ alpha-olefin monomer.

28. The film of claim 1 or 2, wherein slip or antiblock additives are excluded from the skin layer.

29. The film of claim 1 or 2, wherein slip or antiblock additives are excluded from the skin and core layers.

* * * * *